US008395784B2

(12) United States Patent
Murray et al.

(10) Patent No.: US 8,395,784 B2

(45) Date of Patent: Mar. 12, 2013

(54) METHOD OF LEAD EDGE DETECTION IN AN INKJET PRINTER

(75) Inventors: Richard A. Murray, San Diego, CA (US); Gregory M. Burke, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 352 days.

(21) Appl. No.: 12/890,934

(22) Filed: Sep. 27, 2010

(65) Prior Publication Data

US 2012/0075641 A1 Mar. 29, 2012

(51) Int. Cl.
*G01B 11/14* (2006.01)

(52) U.S. Cl. ........................................................ 356/614

(58) Field of Classification Search .................. 356/614; 347/16

See application file for complete search history.

(56) References Cited

U.S. PATENT DOCUMENTS

| | | | | |
|---|---|---|---|---|
| 4,961,658 | A * | 10/1990 | Takagi | 400/636.1 |
| 5,997,129 | A * | 12/1999 | Matsuhashi | 347/35 |
| 6,036,298 | A * | 3/2000 | Walker | 347/19 |
| 6,523,925 | B1 * | 2/2003 | Driggers | 347/16 |
| 2008/0036814 | A1 * | 2/2008 | Takeishi et al. | 347/19 |

* cited by examiner

*Primary Examiner* — Roy M Punnoose

(74) *Attorney, Agent, or Firm* — Peyton C. Watkins

(57) ABSTRACT

A method of detecting an edge of a piece of media in a printer, the method includes providing a carriage for moving a printhead and a photosensor along a carriage scan path; providing a light source; providing a light guiding element having a first end that is aimed at a first predetermined position along a media advance path between a media input region and a printing region and a second end that is aimed at a second predetermined position along the carriage scan path, moving the carriage to an edge-detection position such that the second end of the light guiding element is aimed at the field of view of the photosensor; directing light from the light source toward the first predetermined position; obtaining a signal generated in response to light received in the photosensor; and analyzing the signal to detect the edge of the piece of media.

7 Claims, 9 Drawing Sheets

210

METHOD OF LEAD EDGE DETECTION IN AN INKJET PRINTER

CROSS-REFERENCE TO RELATED APPLICATIONS

Reference is made to commonly assigned, co-pending U.S. patent application Ser. No. 12/711,367, filed concurrently herewith, entitled "Lead Edge Detector for Printer," the disclosure of which is incorporated herein.

FIELD OF THE INVENTION

This invention pertains generally to carriage printer apparatuses and more particularly to apparatuses and methods for detection of the leading edge of a recording medium.

BACKGROUND OF THE INVENTION

In a carriage printer, such as an inkjet carriage printer, a printhead is mounted in a carriage that is moved back and forth across the region of printing. To print an image on a sheet of paper or other recording medium (sometimes generically referred to as paper herein), the recording medium is advanced a given distance along a recording medium advance direction and then momentarily stopped. While the recording medium is stopped and supported on a platen, the printhead carriage is moved along a carriage scan path. The carriage scan path extends in a direction that is substantially perpendicular to the recording medium advance direction. As it travels along the carriage scan path, controllable marking elements in the printhead record marks on the recording medium—for example by ejecting drops from an inkjet printhead. After the carriage has printed a swath of the image while traversing the recording medium, the recording medium is advanced, the carriage direction of motion is reversed, and marking repeated so that the image is formed swath by swath.

In order to produce high quality images, it is helpful to accurately locate the leading edge of the recording medium as it is advanced toward the carriage scan path. Accurate location of the leading edge permits more precise coordination of media handling as the recording medium enters the carriage scan path and can be used for timing the start of printing and for registration of image content relative to that edge to close tolerances.

Conventional solutions for leading edge detection include the use of pivoting mechanical fingers that are located at a suitable position along the media advance path and are caused to pivot upon contact with the leading edge as the medium is advanced. The movement of these devices is typically detected by a separate optical sensor that responds when a portion of the pivoting element interrupts a light path or, alternately, is moved out from a light path or moves another component with respect to a sensed light path. One example of this type of mechanism is given in U.S. Pat. No. 6,523,925 entitled "Media Leading Edge Sensor" to Driggers. Conventional solutions of this type work, but have a number of inherent shortcomings. Pivoting members can collect dust and dirt, sticking in position instead of responding as intended to the moving receiver edge. Space and components for a separate optical path must be provided, typically beneath the platen over which the receiver travels, with its own light source and sensor and associated power and signal wiring.

Competitive pressures drive the need to provide high quality printing at lower cost, as well as the need to design printing apparatus with reduced dimensions and footprint. There is a recognized need to reduce the parts count and complexity of these systems without compromising image quality and performance.

SUMMARY OF THE INVENTION

It is an object of the present invention to address the need for an improved apparatus and method for lead edge detection in a carriage printer. With this object in mind, the present invention provides a carriage printer having a method of detecting an edge of a piece of media in a printer, the method comprising providing a carriage for moving a printhead and a photosensor along a carriage scan path; providing a light source; providing a light guiding element having a first end that is aimed at a first predetermined position along a media advance path between a media input region and a printing region and a second end that is aimed at a second predetermined position along the carriage scan path, moving the carriage to an edge-detection position such that the second end of the light guiding element is aimed at the field of view of the photosensor; directing light from the light source toward the first predetermined position; obtaining a signal generated in response to light received in the photosensor; and analyzing the signal to detect the edge of the piece of media.

This invention has the advantage that it provides leading edge detection without requiring mechanical contact with the edge of the receiver. A light signal transition is used for sensing the lead edge of a recording medium.

This invention has the additional advantage that it can take advantage of existing carriage sensor components, re-using components already provided on the printer to provide additional sensing functions.

It is to be understood that the attached drawings are for purposes of illustrating the concepts of the invention and may not be to scale.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
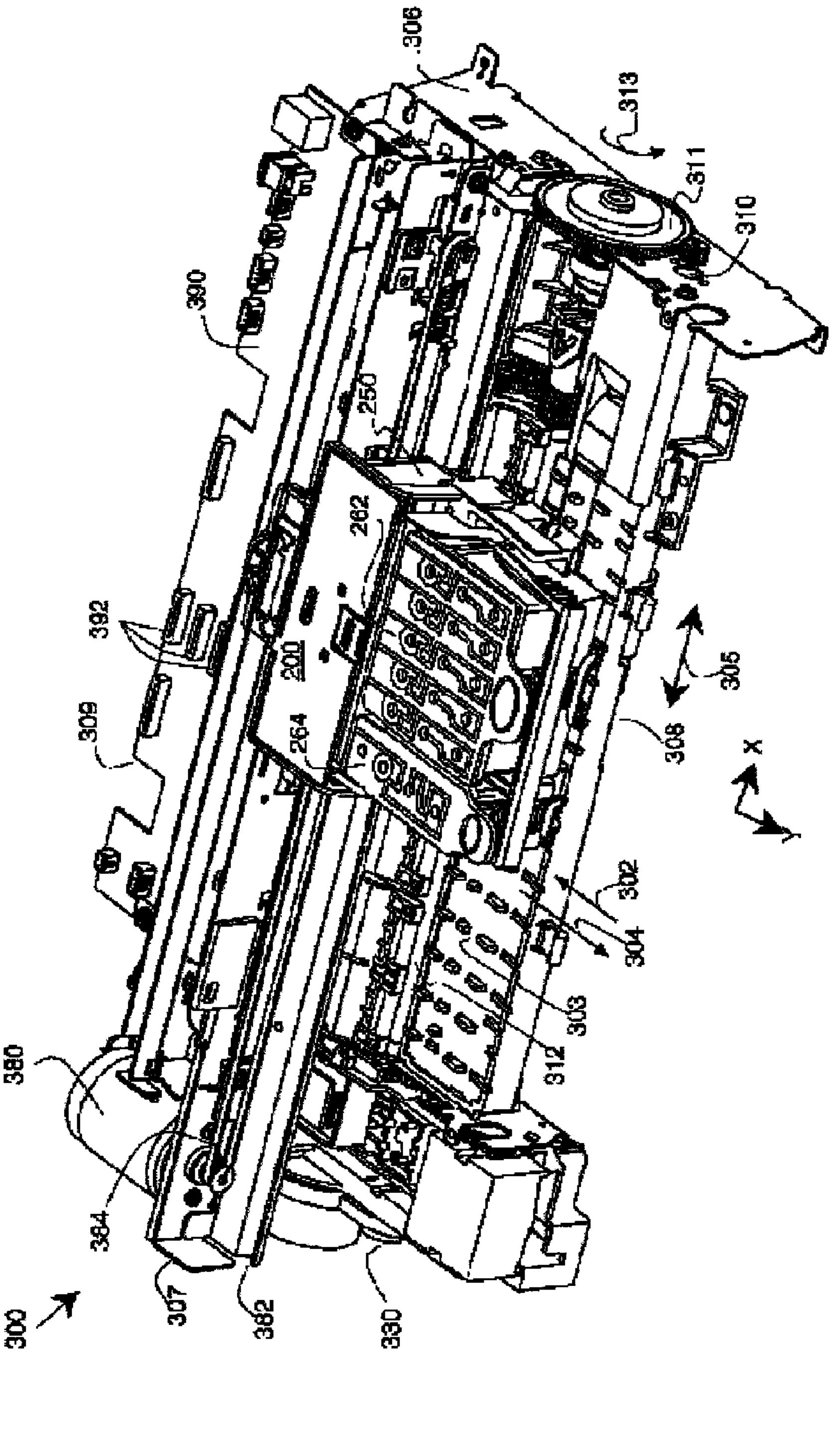
FIG. 1 is a perspective view showing components of a carriage printer of the present invention.

By way of example, FIG. 1 shows a printer 300, with some parts hidden so that other parts can be more clearly seen. Printer 300 has a printing region 303 (also referred to as a platen) across which a carriage 200 is moved back and forth along a carriage scan path 305 that extends along the X axis between the right side 306 and the left side 307 of printer 300 while printing on recording medium that is supported by the platen that provides printing region 303. Carriage motor 380 moves a belt 384 to move carriage 200 back and forth along carriage guide rail 382. In this way, carriage 200 is actuable to move along a carriage scan path 305. Printhead chassis 250 is mounted in carriage 200, and ink supplies 262 and 264 are mounted in the printhead chassis 250. In this orientation of printhead chassis 250, the droplets of ink are ejected downward onto the recording media in printing region 303 in the view of FIG. 1. Ink supply 262, in this example, contains five ink sources cyan, magenta, yellow, photo black, and colorless protective fluid, while ink supply 264 contains the ink source for text black. Paper, or other recording medium (sometimes generically referred to as "medium", "print medium" or "paper" herein) is loaded along paper load entry direction 302 toward the front 308 of printer 300. At the beginning of a printing job, a pick-up roller (not shown) advances a sheet of recording medium from the paper loading region toward the printing region. Printed paper traveling from the rear 309 exits along direction 304.

A feed roller 312 near the printing region includes a feed roller shaft along its axis, and a feed roller gear 311 is mounted on the feed roller shaft. Feed roller 312 can include a separate roller mounted on the feed roller shaft, or a thin high friction coating on the feed roller shaft. The motor that powers the paper advance rollers is not shown in FIG. 1, but a hole 310 at the right side 306 of the printer 300 is where the motor gear (not shown) protrudes through in order to engage feed roller gear 311, as well as the gear for the discharge roller (not shown). For normal paper pick-up and feeding, it is desired that all rollers rotate in forward direction 313. In order to straighten out skewed paper, in some cases the feed roller is initially rotated to oppose forward rotation while the pick-up roller rotates to move the paper forward. After the leading edge of the paper is detected and sufficient time for deskewing is allowed, the feed roller is rotated in forward direction 313 and the rotation of the pick-up roller is stopped until the printer is ready for the next sheet. Toward the left side 307 in the example of FIG. 1 is a maintenance station 330. Toward the rear 309 of the printer in this example is located an electronics board 390, which contains cable connectors 392 for communicating via cables (not shown) to the printhead carriage 200 and from there to the printhead. Also on the electronics board are typically mounted motor controllers for the carriage motor 380 and for the paper advance motor, a controller (i.e. a processor and/or other control electronics for controlling the printing process), and an optional connector for a cable to a host computer.

It is known in the printing art to attach an optical sensor of some type directly to the printhead carriage of a carriage printer. See for example U.S. Pat. No. 5,170,047, U.S. Pat. No. 5,905,512, U.S. Pat. No. 5,975,674, U.S. Pat. No. 6,036,298, U.S. Pat. No. 6,172,690, U.S. Pat. No. 6,322,192, U.S. Pat. No. 6,400,099, U.S. Pat. No. 6,623,096, U.S. Pat. No. 6,764,158 and U.S. Pat. No. 6,905,187. An optical sensor assembly with this arrangement is typically termed a carriage sensor. In the same way that the printhead can mark on all regions of the paper by the back and forth motion of the carriage and by the advancing of the recording medium between passes of the carriage, the carriage sensor is able to provide optical measurements, typically of optical reflectance of the recording medium, for all regions of the medium. A carriage sensor assembly typically includes one or more photosensors and one or more light sources, such as light-emitting diodes (LEDs), mounted such that the emitted light, reflected from the printing side of the recording medium, is received and sensed by the one or more photosensors. An external lens can be configured to increase the amount of reflected light that is received by the photosensor. Typically the photosensor signal is amplified and processed to separate the signal from the background noise. LEDs and photosensors can be oriented relative to each other such that the photosensor receives specular reflections of light emitted from an LED (i.e. light reflected from the recording medium at the same angle as the incident angle relative to the normal to the nominal plane of the recording medium) or diffuse reflections of light emitted from an LED (i.e. light reflected from the recording medium at a different angle than the angle of incidence). Diffuse light scattering can be due to local roughness in the recording medium or to localized curvature in the medium for example.

Figure 2:
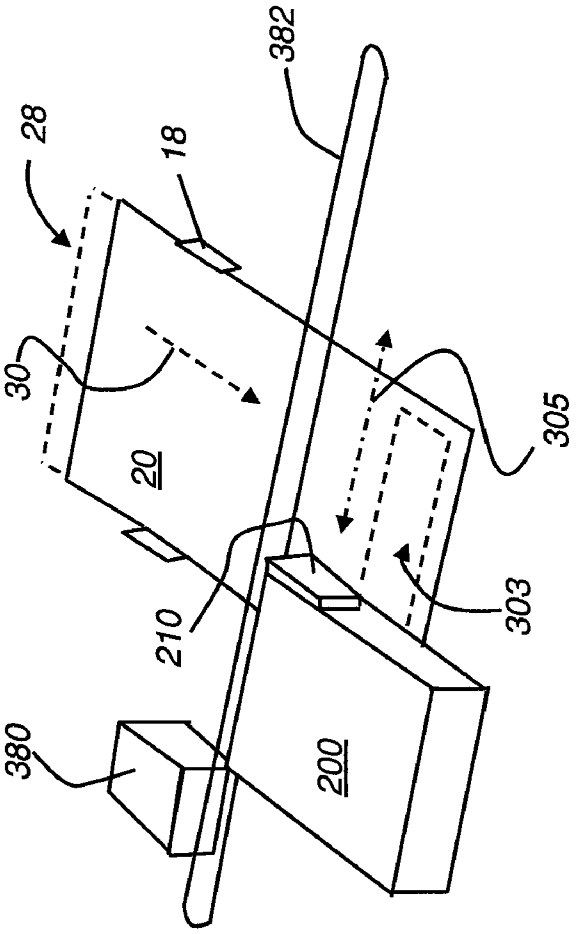
FIG. 2 is a schematic diagram that shows components of the carriage printer of particular interest for lead edge detection.
Figure 5:
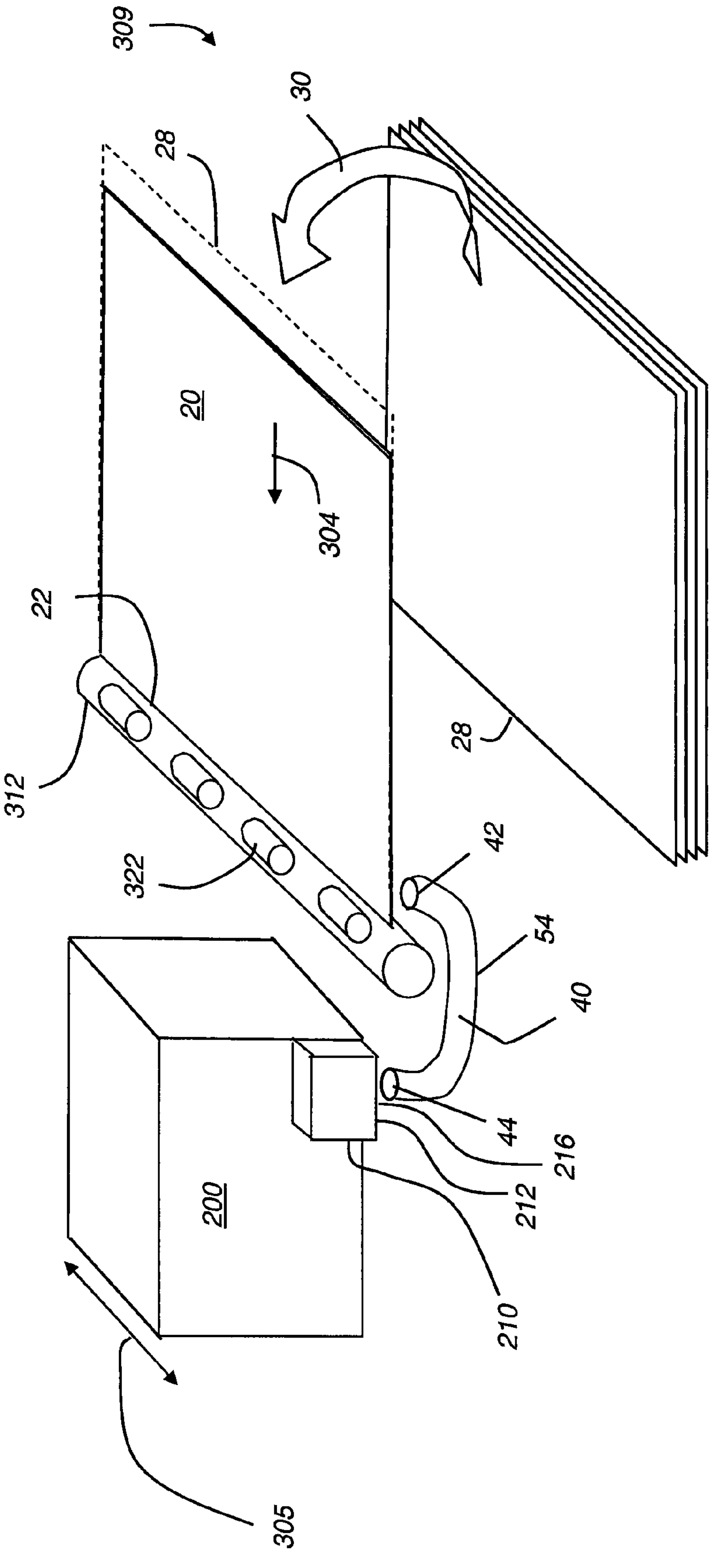
FIG. 5 is a schematic diagram that shows components of the carriage printer used for lead edge detection in an embodiment where a light pipe or one or more optical fibers provide a light guiding element.

The simplified schematic diagram of FIG. 2 shows some components of particular interest for printing and for detecting the edge of a piece of media using the apparatus and methods of the present invention. Carriage 200 is moved across carriage scan path 305 for printing a swath one at a time onto recording medium 20, along a printing region 303. A media advance path 30 is orthogonal to carriage scan path 305. One or more edge guides 18 is provided along the media advance path to align the side edge(s) of recording medium 20 that has been obtained from a media input region 28, such as a stack of sheets within a printer drawer, for example. With reference to FIG. 1 and FIG. 5, a portion of the media advance path 30 can be C-shaped in some embodiments, so that the media input region 28 can be located near the front 308 of the printer 300. After a fed sheet of medium turns a corner at the rear 309 of the printer 300, an effective media input region 28 can be located toward the rear 309. In any case, the media input region 28 is upstream of printing region 303. A carriage sensor assembly 210 is used for sensing the left and right edges of the sheet of recording medium and can be used for measuring printhead alignment.

Figure 3:
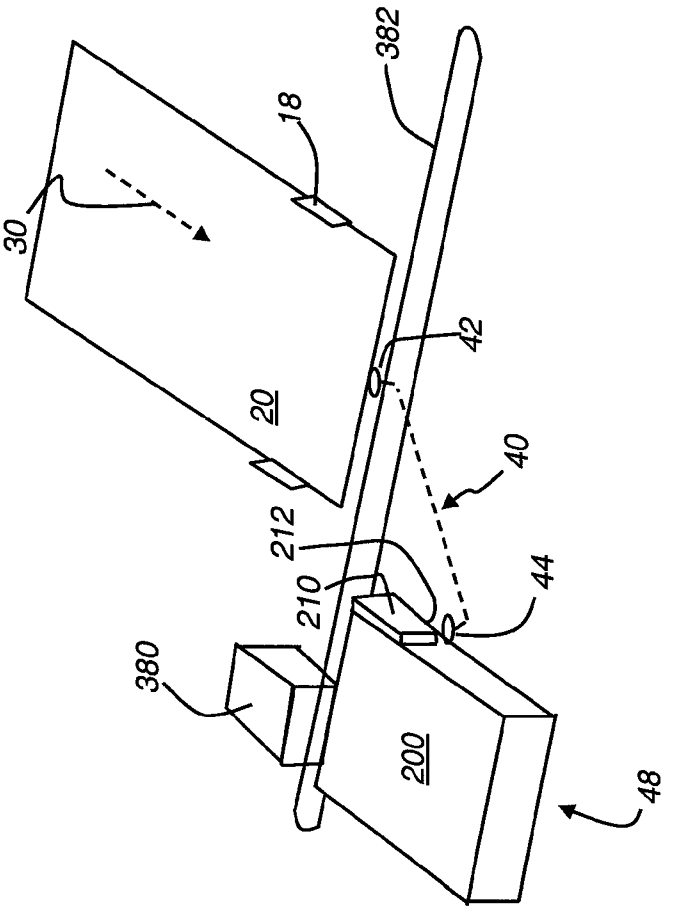
FIG. 3 is a schematic diagram that shows the printer carriage in position for sensing the lead edge of a recording medium in one embodiment.

The simplified schematic diagram of FIG. 3 shows components and altered component positions used for detection of leading edge 22 of recording medium 20 prior to printing. Carriage 200 is moved away from the media advance path 30, to a lead edge detection position 48 while recording medium 20 is advanced. (Referring back to FIG. 1, lead edge detection position may lie near maintenance station 330.) A photosensor 212 is mounted on carriage 200 as part of carriage sensor assembly 210 and, when carriage 200 is in lead edge detection position 48, is disposed in a particular position for receiving a light signal in its field of view for leading edge detection. A light guiding element 40, a portion of which is hidden from view and represented by a dashed line in FIG. 3, directs light between a first end 42 that lies along media advance path 30 and a second end 44 that lies proximate the position of photosensor 212 when carriage 200 is in lead-edge detection position 48. In other words, light guiding element 40 has a first end 42 that is aimed at a first predetermined position along media advance path 30 between a media input region 28 and a printing region 303. Light guiding element 40 also has a second end 44 that is aimed at a second predetermined position along the carriage scan path 305. This arrangement enables photosensor 212 to detect and provide a signal when the leading edge of recording medium 20 arrives at first end 42.

In one embodiment, photosensor 212 is provided using carriage sensor assembly 210 (FIG. 2) that already performs other functions, such as detection of one or more side edges of recording medium 20, and assessing of print test patterns provided on recording medium 20 as described in commonly assigned U.S. Pat. No. 7,800,089, incorporated herein by reference in its entirety. Referring to the partial cutaway view of FIG. 4, there is shown an orientation of carriage sensor assembly 210 that is appropriate for an embodiment in which the recording medium, when in printing region 303, is positioned horizontally below the printhead 250 and the carriage sensor assembly 210 which are mounted on carriage 200. First light source 216, an LED in the carriage sensor assembly 210 mounted on carriage 200 in the embodiment shown, is oriented to emit light vertically downward along the Z direction, i.e. substantially normal to the XY plane of the recording medium in the printing region. In other words, the angle between the orientation of light source 216 and the normal to a plane parallel to the platen is zero. Herein, the terms "plane of the recording medium in the printing region" and "plane parallel to the platen" will be used interchangeably, as the surface of the platen supports the recording medium in the printing region. The platen can have regions of recesses as well as a series of protrusions for supporting the paper, but in such a configuration "a plane parallel to the surface of the platen" is meant herein to designate a plane that is determined by the surfaces of the protrusions upon which recording medium is intended to be supported. Photosensor 212 is configured to be on one side of first light source 216. Photosensor 212 is oriented to receive light along a direction that is at an angle of about 45 degrees with respect to the normal Z to the XY plane of the platen (and pointing toward the back of the printer so that it does not receive external stray light) in this example. In some embodiments, light source 216 is an infrared light source having an emission spectrum that is otherwise typically not found in the printer or in ambient lighting. In such embodiments, visible external stray light can be filtered out before striking photosensor 212, in order to improve the signal to noise ratio. Photosensor 212 provides an output signal (typically an output current) corresponding to the amount of light that strikes the photosensor 212.

Second light source 218, also shown as an LED, used for directing light for reflection from the media surface and toward photosensor 212, is not used for leading edge detection in embodiments of the present invention; instead, this second LED performs other functions such as to determine media surface type, in a manner described in more detail in the incorporated U.S. Pat. No. 7,800,089. One or more lens elements, such as integrated lenses 215, 217 and 219 shown in FIG. 4, can be used with photosensor 212 and light sources 216 and 218 respectively.

Figure 4:
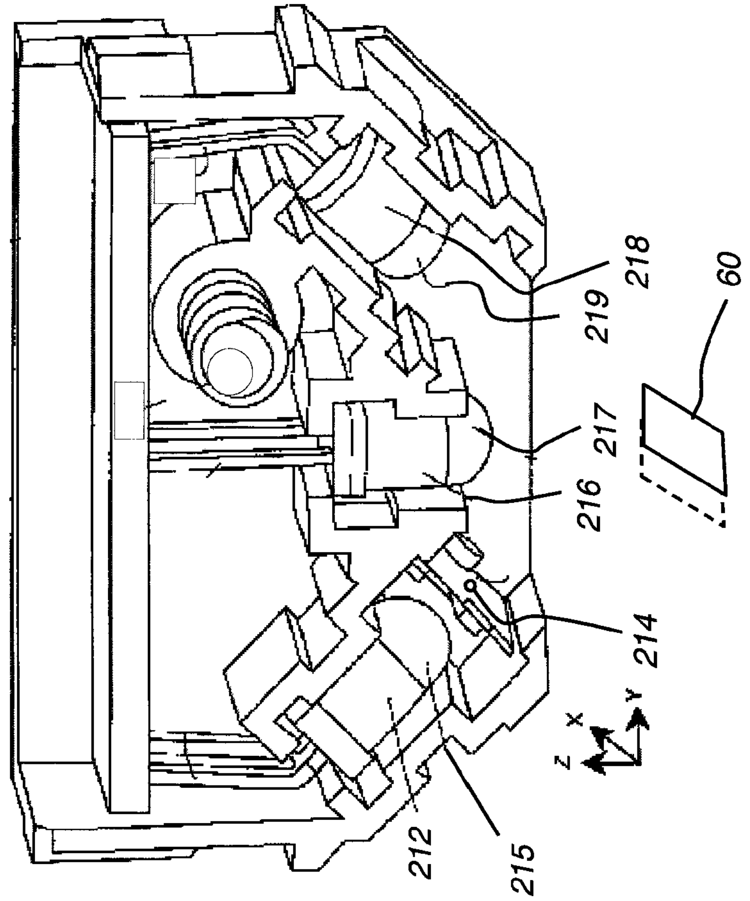
FIG. 4 is a cutaway side view showing a carriage sensor that is adapted for lead edge sensing in one embodiment.

Still referring to FIG. 4, an aperture 214 determines the range of angles of incident light rays that are able to pass to the photosensor 212, while the opaque region around the aperture blocks light rays outside this range of angles. The region of the recording medium that the photosensor "sees" depends not only on the geometry of the aperture, but also upon its orientation relative to the plane of the recording medium. This region that the photosensor "sees" will also herein be considered the photosensor's field of view. An optional shutter 60, internal to or external to carriage sensor assembly 210, allows the light path to photosensor 212 to be selectively blocked to prevent inadvertent detection and response, such as to stray light, for example. The optional shutter 60 could alternately be placed at or near first or second end 42 or 44 to selectively block ink mist or dust from landing on and accumulating on ends 42 and/or 44 of light guiding element 40. In one embodiment, the shutter is configured to open when carriage 200 reaches a predetermined position along the carriage scan path 305. Optionally, the moving carriage 200 can be used to open the shutter 60, which can be spring-biased, for example, to be in a normally closed position.

In the embodiment shown in FIG. 4 where the axes of the photosensor 212 and the aperture 214 are inclined relative to the Y direction (where Y is in the media advance direction), the field of view of photosensor 212 through aperture 214 will be somewhat elongated along the Y direction even if the physical shape of the aperture 214 is circular. To modify the field of view of the photosensor, aperture shapes that are somewhat elongated (such as rectangles or ovals) with the longer dimension of the aperture having a component along either X or Y can be used (where X is the carriage scan direction). Aperture shape can be designed to enhance the ratio of signal to background noise, for example, depending on the angles of incoming light.

The use of an aperture rather than an external lens (i.e. a lens in addition to the integrated lenses 215, 217 and 219 described above) is cost advantaged, but may also provide a weaker signal so that more sensitive electronics and data processing methods may be needed for leading edge signal detection similar to what is described in incorporated U.S. Pat. No. 7,800,089. However, the use of an aperture is not only compatible with both lead edge sensing and other alignment functions, but also enables the use of inexpensive off-the-shelf LED and photosensor components, without requiring special lens designs for those components. In this example, the axis of the aperture 214 is considered to be parallel to the axis of the photosensor 212, and both are oriented at an angle with respect to the normal to the platen.

One problem that complicates lead edge detection using the carriage sensor in many types of printers relates to the presence of feed rollers and other rollers along media advance path 30. The simplified schematic view of FIG. 5 shows how a U-shaped light guiding element 40 addresses this problem without using components that might obstruct the media path. Here, leading edge 22 of recording medium 20 is directed into the nip between feed roller 312 and a set of pinch rollers 322. Light guiding element 40 directs light around these rollers and to photosensor 212 in carriage sensor 210. Light guiding element 40 has a joining portion 54 between first and second ends 42 and 44, wherein joining portion 54 is curved.

Light guiding element 40 acts as a light guide, directing light from one end to the other, substantially without modulation of the light. In one embodiment, light guiding element 40 is a substantially rigid light pipe, a flexible fiber optic cable or fiber optic bundle. Where multiple fiber optic elements are used, a portion of the fiber optic elements at second end 44 are aimed at an angle that provides a return light path to photosensor 212. Optionally, one or more spectral filters can be provided at either or both ends 42 and 44, or light guiding element 40 can be made using a material that passes the light (visible or infrared) emitted by light source 216, but filters out other wavelengths, in order to improve signal to noise ratio. Optionally, either or both ends 42 and 44 (or portions thereof) can be treated in some way to receive or distribute light in an appropriate manner, such as by terminating in a lens or curved surface or with a diffusive surface. For example, second end 44 (or a portion thereof) can be dome-shaped in order to help gather light from the light source. With a fiber optic cable, for example, second end 44 can be treated to diffuse received light in order to increase the amount of light received at the photosensor. For example, second end 44 can be frosted or roughened for diffuse scattering of light. Such measures can also help to reduce the amount of direct reflections of light from light source 216 off second end 44 and back to photosensor 212.

FIGS. 3 and 5 show the relative locations of first and second ends 42 and 44 of light guiding element 40 with respect to media advance path 30. Each end 42 and 44 can serve as an aperture for light traveling in one or two directions. The optical term "aperture", as understood by those skilled in the optical arts, indicates an entry or exit region for light, such as a terminus or end-point of an optical system, through which light can travel into or out from an optical system and defines the allowable angles of light that travel through the system. Such an aperture can be a physical hole or opening, or it can be a transparent or translucent member. In one embodiment, the light source is provided by carriage sensor 210. Light source 216, as described with reference to FIG. 4, directs light into light guiding element 40 at its second end 44. This light, output at first end 42, is reflected from media 20 and is returned to second end 44 through light guiding element 40.

When using a sensor embodiment where the light source 216 and the photosensor 212 are located next to one another on the carriage 200, as shown in FIG. 5, both the light from light source 216 and the light to photosensor 212 share a common optical path through light guiding element 40. That is, light is traveling in both directions within light guiding element 40. A problem that can arise in such embodiments if there is a reflective solid surface at second end 44 of light guiding element 40 is that a portion of the light emitted by light source 216 can reflect off second end 44 back into photosensor 212. Unless special measures are taken, such light reflected off second end 44 can be much greater than the light that passes through light guiding element 40, reflects off recording medium 20 and passes back through light guiding element 40 to photosensor 212. As a result, the signal for detecting lead edge 22 can be lost in the large background of light reflected from second end 44. One way to reduce the extent of this problem is to coat second end 44 with an anti-reflective coating.

Figure 6B:
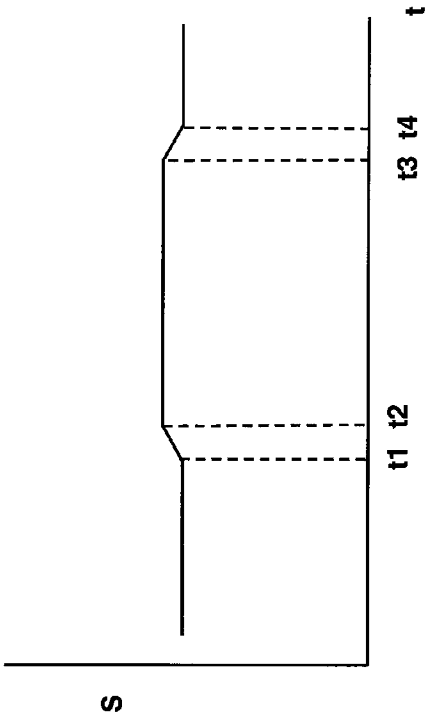
FIG. 6B is an example of a photosensor signal as a piece of recording medium is advanced.
Figure 6C:
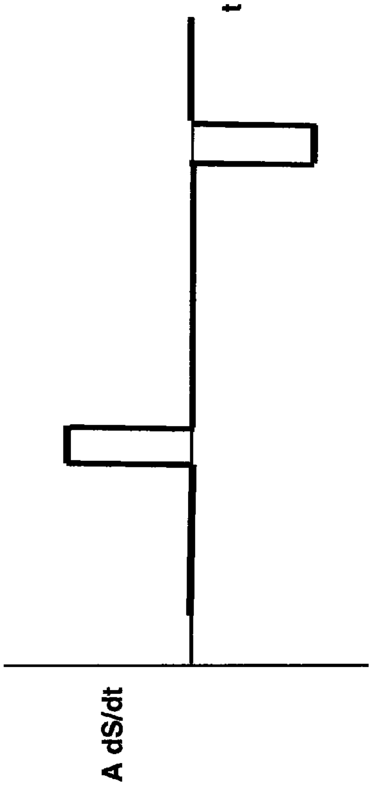
FIG. 6C is an amplified time derivative of the signal of FIG. 6B.
Figure 6A:
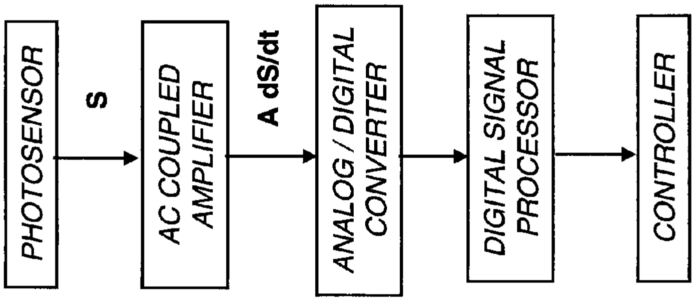
FIG. 6A is a block diagram that shows components of the carriage printer for processing the signal from the photosensor.

A second way to address the problem due to light reflecting off second end 44 back into the photosensor 212 is to send the signal from photosensor 212 to an AC-coupled amplifier as described in U.S. Pat. No. 7,800,089. A block diagram of electronics for processing the photosensor signal is shown in FIG. 6A. The output signal S (verses time t) from photosensor 212 includes a large background component including a relatively constant portion due to light reflected from the second end 44 into photosensor 212, as shown in FIG. 6B. In the example of FIG. 6B, it is assumed that the field of view of the photosensor 212 is rectangular (due to a rectangular aperture). At time t1, the leading edge of a piece of recording medium just enters the field of view of the photosensor 212. As more of the recording medium enters the field of view, more reflected light is received by the photosensor and signal S increases. At t2 the recording medium fills the field of view of the photosensor. Between t2 and t3 (where the trailing edge of the paper begins to exit the field of view, the amount of reflected light remains substantially constant. As the recording medium exits the field of view between t3 and t4, signal S decreases. After the recording medium is completely out of the field of view, photosensor signal S is substantially the same as it was initially, due to light reflected from second end 44. Both analog circuitry and subsequent digital data processing can be used to enhance the signal relative to the background noise. The purpose of an AC amplifier circuit is to amplify the signal from photosensor 212 and condition the signal such that the portion of interest can be properly represented by the full range of an 8 bit analog to digital converter (ADC). A coupling capacitor in the AC-coupled amplifier has the important effect of blocking out the DC portion of the photosensor signal. Because the reflection of light from light source 216 off the second end 44 of light guiding element is substantially constant, this constant background is a DC component of the photosensor signal that is blocked by the coupling capacitor. For the amplifier circuit described in U.S. Pat. No. 7,800,089, the output signal is the amplified time derivative of S (denoted as A dS/dt in FIG. 6C). As a result, even the small changes in signal level due to the leading edge 22 (and/or trailing edge) of recording medium 20 changing the amount of light reflected back to photosensor 212 become readily detectable. Furthermore, the amplifier is designed to have a gain that is low at low frequencies and low at high frequencies, but having a comparatively larger gain at a frequency that corresponds to the leading edge 22 of the recording medium 20 entering and eventually covering the field of view of the photosensor 212. For example, for a field of view of about 0.125 inch and a paper advance speed of about 10 to 40 inches per second, it is desired to have a relatively high gain around 80 Hz to 320 Hz. Once the amplified photosensor signal has been digitized in the ADC to provide digital data, digital signal processing can be used to further enhance the signal relative to background noise. The processed signal is then sent to the controller in order to control printer functions on the basis of the detection of the leading edge and/or the trailing edge of the recording medium. Herein, the word "signal" is sometimes used to refer to the signal sent by the photosensor, sometimes to the amplified (or amplified time derivative) signal from the amplifier, sometimes to digital data from the ADC and sometimes to data processed by digital signal processing. In other words, the signal is either the raw photosensor signal, or the signal after some degree of analog and/or digital processing.

Figure 7:
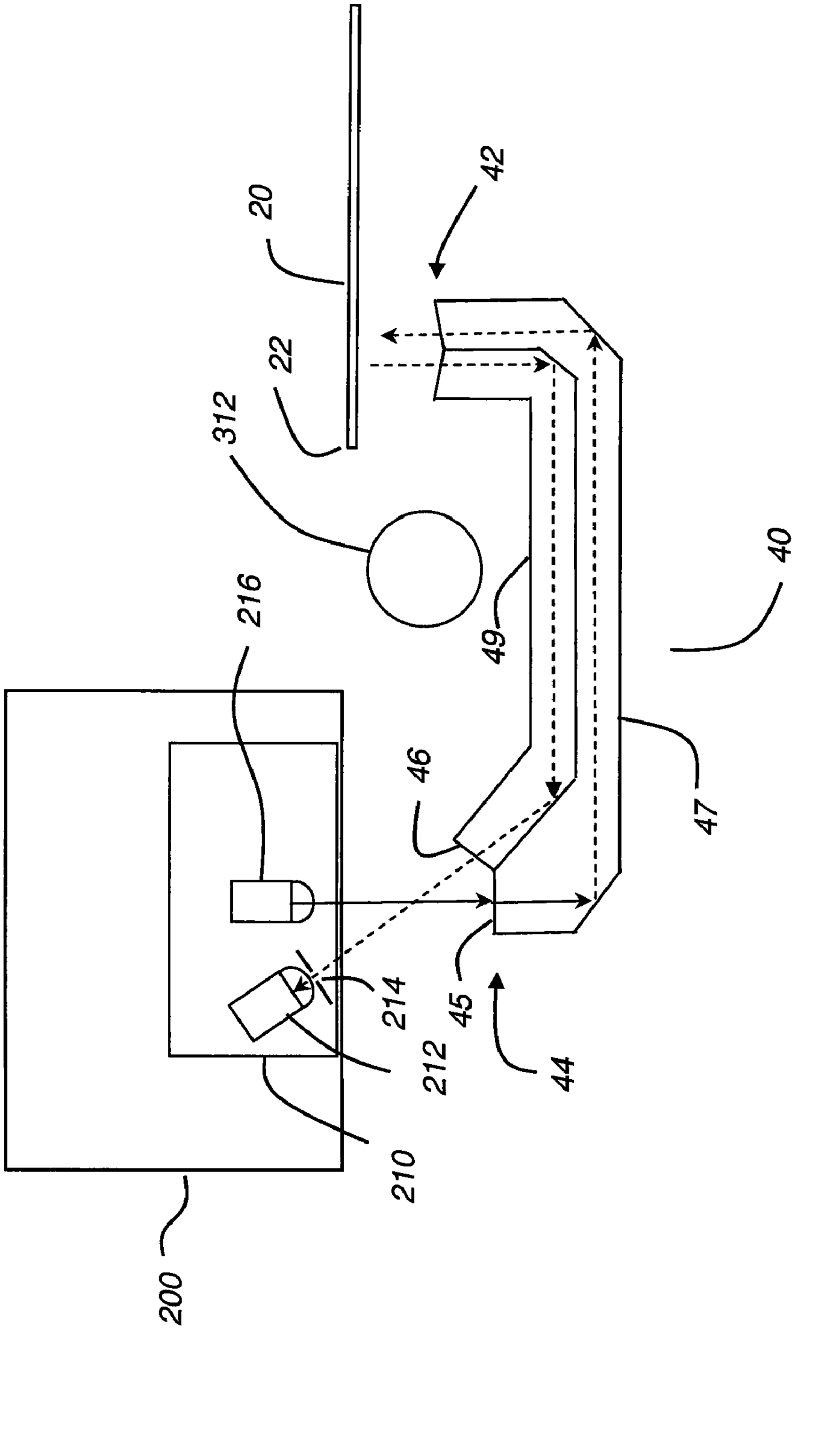
FIG. 7 is a schematic diagram that shows components of the carriage printer used for lead edge detection in an embodiment where the light guiding element has two sections.

A third way to address the problem due to light reflecting off second end 44 back into the photosensor 212 is to configure second end 44 to have an input portion 45 for receiving light from light source 216 and an output portion 46 for sending light to photosensor 212, as shown schematically in FIG. 7. Input portion 45 is disposed at an orientation such that specularly reflected light from the surface of input portion 45 is not directed toward photosensor 212, and only a small amount of diffusely reflected light from the surface of input portion 45 is able to pass through aperture 214 to reach photosensor 212. Output portion 46 is disposed at an orientation such that its surface is aimed toward aperture 214 and the photosensor 212. For example, the surface of output portion 46 can be substantially parallel to the plane of aperture 214. The surface of output portion 46 can also be frosted or roughened to promote diffuse scattering of light to facilitate more light reflected from recording medium 20 passing through aperture 214. Optionally, in addition to configuring second end 44 as an input portion 45 and an output portion 46, the light guiding element itself can be partitioned into a first channel 47 and a second channel 49. First channel 47 is configured to direct light from input portion 45 toward recording medium 20, while second channel 49 is configured to direct reflected light from recording medium 20 toward output portion 46. First channel 47 can be a first optical fiber bundle and second channel 49 can be a second optical fiber bundle for example. Alternatively, two light pipes could be used for the two different channels, or a single light pipe having a Y at the first end 42 can be used. As indicated in FIG. 7 second end 42 of first channel 47 can be configured differently than second end 42 of second channel 49 for improved capturing of light reflected from recording medium 20.

Figure 8:
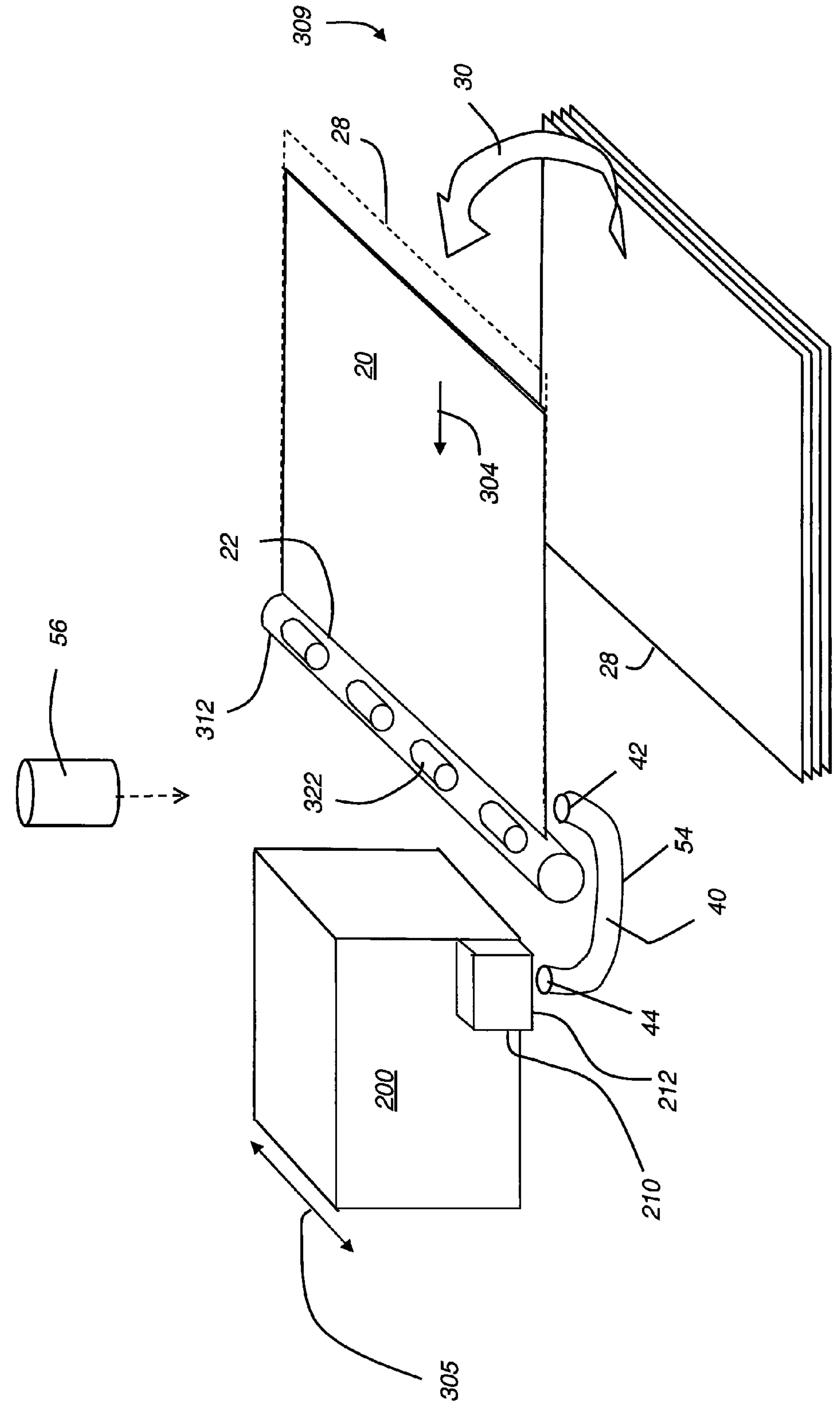
FIG. 8 is a schematic diagram that shows components of the carriage printer used for lead edge detection in an embodiment where the light source is not mounted on the carriage.

An alternative way to avoid the problem of light reflected off second end 44 back into the photosensor 212 is to separate the light source from the photosensor 212. FIG. 8 shows an arrangement in which a light source 56 is provided opposite first end 42, so that the lead edge of media 20 interrupts the light path through light guiding element 40. With this alternate arrangement, light travels in a single direction within light guiding element 40. Light source 56 can be an LED or other solid-state light source, or a bulb, for example, and need not be mounted on carriage 200.

Figure 9:
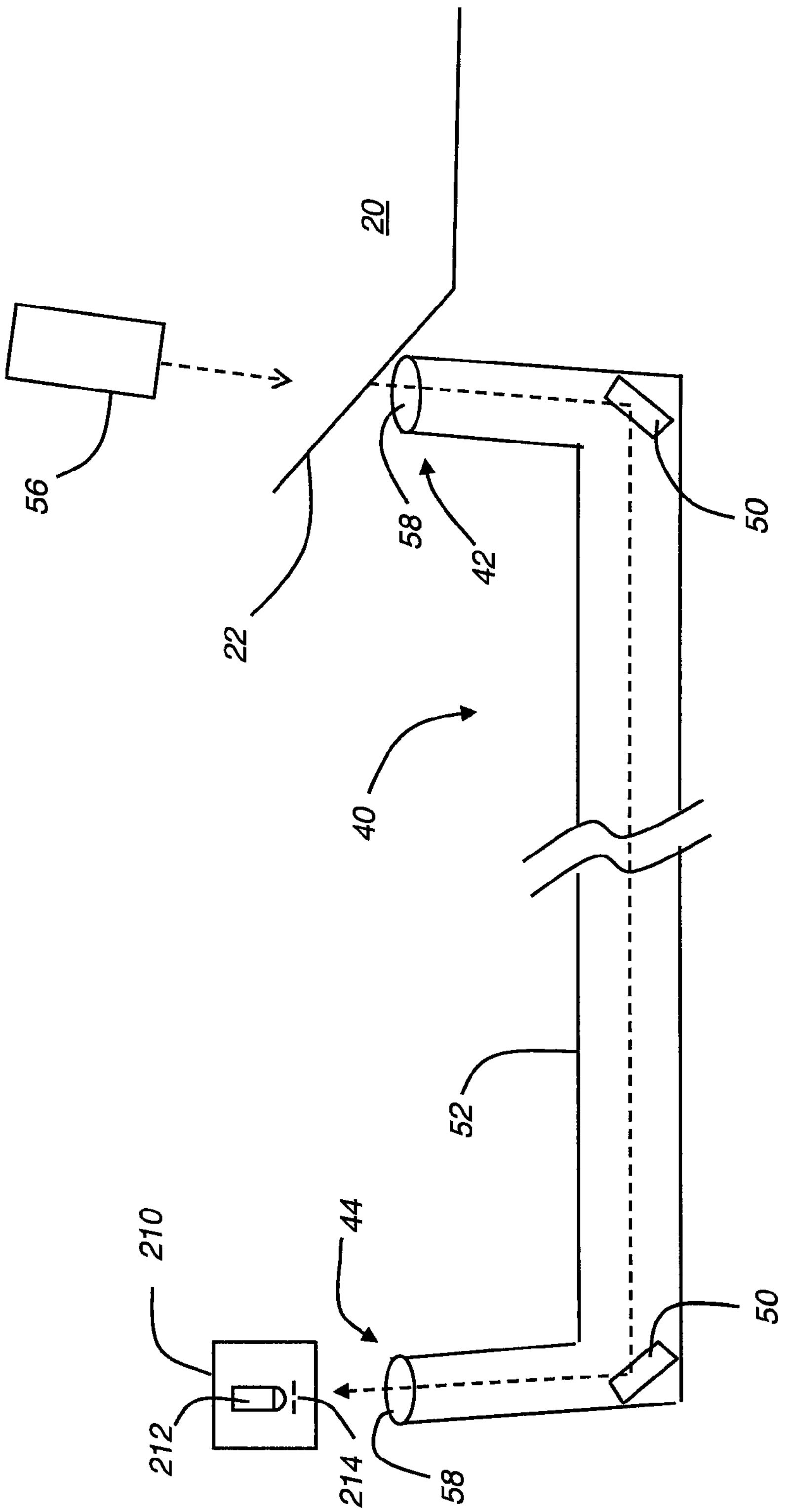
FIG. 9 is a schematic diagram that shows components of the carriage printer used for lead edge detection in an alternate embodiment that uses reflective elements.

Yet another way to avoid the problem of light reflected off second end 44 back into the photosensor 212 is to configure second end 44 as a physical opening, rather than as a solid surface that can reflect light. FIG. 9 shows an example where light guiding element 40 includes a tube 52 having reflective elements 50 positioned at the corners, and openings 58 at first end 42 and second end 44. The example shown in FIG. 9 has an off-carriage light source 56, but other embodiments having an open ended tube can have the light source 216 mounted near the photosensor 212 on the carriage 200, as in FIG. 5

Light guiding element 40 can have any of a number of possible configurations for directing light between first and second ends or apertures at 42 and 44. The use of fiber optics is particularly advantaged since it can allow routing of the light path around other components and obstructions, such as the roller nip presents, as noted earlier. Moreover, the ends of individual optical fibers can be separately oriented, allowing incident or detected light to follow an optimal path for the needed edge-detection function. Alternatively, a light pipe can be injection molded with the U-shape shown in FIG. 5, for example.

The invention has been described in detail with particular reference to certain preferred embodiments thereof, but it will be understood that variations and modifications can be effected within the spirit and scope of the invention. For example, photosensor 212 can be mounted on printer carriage 200 in any suitable position and can be separate from the photosensor that is used as part of carriage sensor 210. A separate light source such as a separate LED can be similarly mounted on the carriage, separately from carriage sensor 210.

PARTS LIST

18 Guide
22 Leading edge
20 Recording medium
28 Media input region
30 Media advance path
40 Light guiding element
42 First end
44 Second end
45 Input portion
46 Output portion
47 First channel
48 Lead edge detection position
49 Second channel
50 Reflective element
52 Tube
54 Joining portion
56 Light source
58 Opening
60 Shutter
200 Carriage
210 Carriage sensor assembly
212 Photosensor
214 Aperture
216, 218 Light source
215, 217, 219 Lens
250 Printhead chassis
262, 264 Ink supply
300 Printer
302 Load entry direction
303 Printing region
304 Direction
305 Carriage scan path
306 Right side
307 Left side
308 Front
309 Rear
310 Hole
311 Feed roller gear
312 Feed roller
313 Forward direction
322 Pinch roller
330 Maintenance station
380 Motor
382 Guide rail
384 Belt
390 Electronics board
392 Cable connectors

The invention claimed is:

1. A method of detecting an edge of a piece of media in a printer, the method comprising:

providing a carriage for moving a printhead and a photosensor along a carriage scan path;

providing a light source;

providing a fiber optic light guiding element having a first end that is aimed at a first predetermined position along a media advance path between a media input region and a printing region and a second end that is aimed at a second predetermined position along the carriage scan path, moving the carriage to an edge-detection position such that the second end of the light guiding element is aimed at the field of view of the photosensor;

directing light from the light source toward the first predetermined position;

obtaining a signal generated in response to light received in the photosensor; and analyzing the signal to detect the edge of the piece of media.

2. The method according to claim 1 further comprising:

providing an AC-coupled amplifier; and amplifying the signal with the AC-coupled amplifier wherein AC represents alternating current.

3. The method according to claim 2, wherein the light source is configured to emit light toward the second end of the light guiding element, and wherein the AC-coupled amplifier is configured to block a portion of the signal that is due to light that is reflected off the second end of the light guiding element.

4. The method according to claim 2, wherein an output of the AC-coupled amplifier is an amplified time derivative of the signal.

5. The method according to claim 1 further comprising moving a piece of recording medium toward the first predetermined position at a speed that is greater than or equal to 10 inches per second and less than or equal to 40 inches per second.

6. The method according to claim 1, wherein the step of analyzing the signal includes converting the signal from analog to digital data.

7. The method according to claim 6, wherein the step of analyzing the signal further includes digital signal processing of the digital data to enhance the signal relative to background noise.

* * * * *